Patented Mar. 21, 1933

1,902,756

UNITED STATES PATENT OFFICE

ARTHUR BINZ, OF BERLIN, AND CURT RÄTH, OF RANGSDORF, GERMANY

HETEROCYLIC ARSENO-COMPOUNDS AND PROCESS OF PURIFYING SAME

No Drawing. Original application filed November 8, 1924, Serial No. 748,717, and in Germany November 19, 1923. Divided and this application filed March 28, 1927. Serial No. 179,180.

Our invention relates to valuable heterocyclical compounds of arsenic and process of purifying same. According to our present invention such compounds are obtained by causing heterocyclical diazo compounds to react with soluble inorganic arsenites and converting the products thus obtained into substances of a lower degree of oxidation by treatment with a reducing agent.

For example, if amino derivatives of heterocyclical compounds capable of being diazotized, for instance amino derivatives of the pyridine or quinoline series, are converted into diazo compounds and the other component of the reaction, such as for instance an arsenious salt or free arsenious acid, is allowed to act upon the said diazo compounds, there are obtained heterocyclical arsonic acids or the salts thereof described in our patent of the United States No. 1,702,334.

If such compounds are now treated with reducing agents, they are converted into compounds of a lower degree of oxidation, for instance into arsine oxides and the like or into the corresponding arseno compounds.

As starting materials for the preparation of compounds in accordance with the present invention substances with heterocyclical nuclei of various kinds may be used, for example such which contain nitrogen or oxygen or sulfur or sulfur dioxide, or elements or groups of different kinds, for example nitrogen and sulfur. The starting materials can be substituted, the substituting radicle being advantageously of an electronegative nature or having a therapeutical influence. Such substituents are for example groups such as the hydroxyl group, amino group, acetyl amino group, glycine group or halogen for instance chlorine etc. Starting materials containing several substituents can be used for carrying out our invention. Instead of starting from substituted compounds the present invention can also be carried into effect in certain cases by first introducing the arsonic acid radicle or other radicles of the kind by the agency of the diazo process and afterwards the desired substituents.

The introduction of arsenic can be achieved in neutral, acid or alkaline solution at ordinary or elevated temperature. It is advisable to previously ascertain by experiment the method best suited for the process. The reaction can be carried out by employing equimolecular quantities of the reacting compounds. Generally, however, it is more favorable to use an excess, which in certain cases may even be fairly large, of the arsenic compound, for example one molecule of the heterocyclical starting material to 2–3 molecules and even more of alkali arsenite. In some cases the reaction is advantageously influenced by adding catalysts, for example copper powder.

Suitable reducing agents are for example hydrosulfite, hypophosphorous acid, bisulfite, or the like. The reaction may also be carried out by the aid of electrolysis. Heterocyclical arseno compounds of the type RAs=AsR can be obtained by starting from oxides, for instance arsine oxides of the type RAs=O and treating them with reducing agents.

By converting arsenic acids or the like into arseno compounds it is possible to easily purify the former substances. Thus, the heterocyclical arsonic acids prepared according to our invention through the agency of the diazo process or by any other method, are converted into the corresponding arseno compounds by treating them with reducing agents, whereafter the latter are reconverted into the corresponding acids by the treatment with suitable oxidizing agents, for instance hydrogen peroxide.

Example 1

One molecular weight of 2-hydroxy-5-amino pyridine is diazotized in hydrochloric acid solution in the usual way by adding sodium nitrite. The diazo solution thus obtained is added drop by drop to a solution of sodium arsenite. The liquid, made slightly alkaline, is then allowed to stand for some time to complete the reaction. The 2-hydroxy-5-pyridine arsonic acid is obtained from the solution in the way customary for the preparation of aromatic arsonic acids. The arsonic acid obtained according to this prescription is treated with hypophosphorous acid, preferably out of contact with air whilst heating moderately. After some time the 2, 2'—5, 5'-dihydroxy-di-arsenopyridine separates as a light yellow powder which is sparingly soluble in the usual solvents.

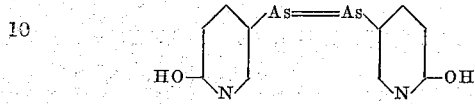

By treating this substance with dilute hydrogen peroxide of about 3% in the cold the acid is again obtained, from which we started, but free from impurities.

Example 2

30 grams of ana-amino-quinoline are dissolved in 300 cc. of water and 120 cc. of concentrated hydrochloric acid and the solution is mixed with 15 grams of sodium nitrite in 200 cc. of water. To the acid diazonium solution alkali is added until the acid reaction towards congo reagent paper has disappeared. The solution is then added drop by drop to a solution containing an excess of sodium arsenite. After stirring for one hour the solution is filtered, concentrated to about 500 cc. acidulated with hydrochloric acid and then, by treatment with sodium hypohosphite, the arseno compound is separated. By treating the arseno derivative with hydrogen peroxide the ana-quinoline-arsonic acid is obtained. It is readily soluble in water, acids and alkalies. From highly diluted hydrochloric acid the hydrochloride of the acid crystallizes with one molecule of water of crystallization.

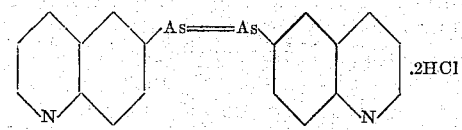

Example 3

5 grams of the pure ana-quinoline-arsonic acid are dissolved in dilute hydrochloric acid and about 15 grams of sodium hypophosphite are added. The mixture is then warmed on a water bath for some time. An orange precipitate is formed which is filtered off and washed with dilute hydrochloric acid. The ana-arseno-quinoline hydrochloride is readily soluble in water.

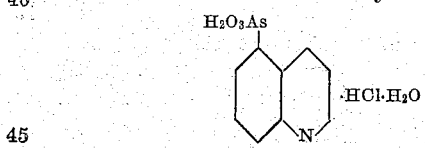

Example 4

30 grams of 6-amino-quinoline are diazotized in the way described in Example 2. The resulting diazonium solution is added to 120 cc. of a solution containing an excess of sodium arsenite. When the reaction is complete the solution is filtered, acidified and evaporated to dryness. The residue is extracted with water to remove the inorganic salts and the undissolved portion digested with cold ammonia. To the ammoniacal solution hydrogen peroxide and hydrochloric acid are added until it shows an acid reaction to congo reagent paper. It is then boiled with animal charcoal. After some time the arsonic acid crystallizes out and is for purifying purposes recrystallized from water. 5 grams of 6-quinoline-arsonic acid thus obtained are dissolved in dilute hydrochloric acid and 15 grams of sodium hypophosphite are added. The mixture is then heated for some time on the water bath. The orange precipitate formed is filtered off and washed with water. The resulting 6-arsenoquinoline hydrochloride is insoluble in water, soluble in strong hydrochloric acid.

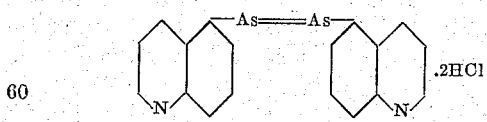

Example 5

30 grams of 8-amino-quinoline are diazotized and arsenized in accordance with Examples 2 and 4. From the resulting solution the arsonic acid is isolated by means of the oxidizing method described in Example 4. The 8-quinoline-arsonic acid obtained in this way is sparingly soluble in water, readily soluble in acids, caustic alkalies and soda carbonate. 5 grams of 8-quinoline-arsonic acid are dissolved in dilute hydrochloric acid and reduced with the aid of 15 grams of sodium hypophosphite. The 8-arsenoquinoline-dihydrochloride is insoluble in water, soluble in strong hydrochloric acid.

Example 6

10 grams of 8-quinoline-arsonic acid are dissolved in 150 cc. of water and 3.2 grams of caustic soda. A solution of 2.5 grams of potassium iodide and 10 grams of concentrated sulfuric acid in 50 cc. of water are added. Thereupon sulfurous acid is passed into the mixture during about 6 hours the temperature not exceeding 10° C. The mixture is boiled whilst stirring vigorously, well cooled, made strongly alkaline by the addition of ammonia and filtered after standing for several hours. The residue is washed with water. For purification purposes the crude product is dissolved, when still moist, in 50 cc. of water and 45 cc. of 2 N-caustic soda solution, shaken several times with ether, filtered and mixed with 50 cc. of 5-N-ammonium chloride solution. The flocculent precipitate which separates, is filtered after it has been standing for several hours, washed with water and dried in a dessicator. The o-quinoline-arsine oxide hydrochloride thus produced is insoluble in water and ammonium hydroxide, sparingly soluble in acids, soluble in caustic soda.

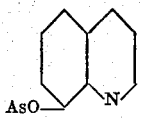

In the same or a similar fashion as pyridine arsonic acids and quinoline arsonic acids a whole series of other heterocyclical arsonic acids can be prepared according to our invention, for example diphenyl-sulfon-arsonic-acid, diphenyl-hydroxy-arsonic acid, indigotine-diarsonic acid, triazole arsonic acid, coumarone-arsonic acid, carbazole arsonic acid, diphenyl-arsine-arsonic acid.

Various changes may be made in the details disclosed in the foregoing specification without departing from the invention or sacrificing the advantages thereof.

We claim:—

1. Process of purifying heterocyclical compounds which comprises transforming a heterocyclical compound of the arsonic acid type into a compound of a lower degree of oxidation by treating same with a reducing agent separating the resulting arseno compound by filtration and reconverting this arseno compound into the starting product by means of an oxidizing agent.

2. Process of purifying heterocyclical compounds which comprises treating a diazotized heterocyclical compound with a soluble inorganic arsenite, reducing the compound of the arsonic acid type obtained separating the resulting arseno compoud by filtration, reconverting this arseno compound into the arsonic acid by oxidation and converting such acid into its salt.

3. Process of manufacturing heterocyclical compounds which comprises causing a soluble inorganic arsenite to react with a pyridine diazo compound and converting the product thus obtained into a substance of a lower degree of oxidation by treatment with a reducing agent.

4. A 2.2′—5,5′-dihydroxy-diarseno pyridine, a light yellow powder which is sparingly soluble in the usual solvents, which has probably the formula

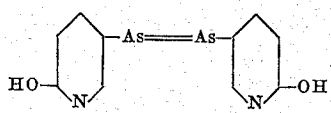

In testimony whereof we affix our signatures.

ARTHUR BINZ.
CURT RÄTH.